United States Patent
Büchler et al.

(10) Patent No.: US 7,206,263 B2
(45) Date of Patent: Apr. 17, 2007

(54) METHOD FOR POSITION CONTROL IN OPTICAL DATA CARRIERS WITH ADDRESS INFORMATION

(75) Inventors: Christian Büchler, Villingen-Schwenningen (DE); Martin Kuner, Donaueschingen (DE); Stefan Kimmelmann, Bad Duerrheim (DE)

(73) Assignee: Thomson Licensing, Boulogne-Billancourt (FR)

( * ) Notice: Subject to any disclaimer, the term of this patent is extended or adjusted under 35 U.S.C. 154(b) by 311 days.

(21) Appl. No.: 10/450,368

(22) PCT Filed: Dec. 10, 2001

(86) PCT No.: PCT/EP01/14458

§ 371 (c)(1),
(2), (4) Date: Jun. 12, 2003

(87) PCT Pub. No.: WO02/50822

PCT Pub. Date: Jun. 27, 2002

(65) Prior Publication Data

US 2004/0057354 A1     Mar. 25, 2004

(30) Foreign Application Priority Data

Dec. 21, 2000     (DE) ................. 100 64 050

(51) Int. Cl.
 *G11B 7/09*     (2006.01)
(52) U.S. Cl. ................. 369/44.28; 369/44.29; 369/44.35; 369/53.24
(58) Field of Classification Search ........... 369/30.16
See application file for complete search history.

(56) References Cited

U.S. PATENT DOCUMENTS

| | | | |
|---|---|---|---|
| 4,796,246 A | 1/1989 | Tsuyoshi et al. | 369/44 |
| 5,646,916 A | 7/1997 | Kobayashi | 369/32 |
| 5,777,963 A | 7/1998 | Fueki et al. | 369/44.34 |
| 6,377,522 B1 * | 4/2002 | Toda | 369/44.28 |
| 6,631,114 B1 * | 10/2003 | Kobayashi | 369/44.13 |

FOREIGN PATENT DOCUMENTS

| | | |
|---|---|---|
| JP | 61-3329 | 1/1986 |
| JP | 04281242 | * 10/1992 |

OTHER PUBLICATIONS

Translation of above Japanese patent which was previously submitted with the IDS mailed with filing papers.
Patent Abstracts of Japan, vol. 010, No. 149, May 30, 1986 & JP 61-003329.
Search Report dated Jun. 14, 2002.

* cited by examiner

*Primary Examiner*—Andrea Wellington
*Assistant Examiner*—Jorge L. Ortiz-Criado
(74) *Attorney, Agent, or Firm*—Joseph J. Laks; Harvey D. Fried; Patricia Verlangieri

(57) ABSTRACT

Track jumping on optical storage media whose address information items invalidate the track error signal at time intervals is intended to be configured more securely and more reliably. For this purpose, at the end of a coarse jump, one or more correction jumps are carried out if the optical scanner is not presently sweeping over an address information area and the track change frequency of the tracks crossed by the scanner falls below a predetermined value.

11 Claims, 6 Drawing Sheets

METHOD FOR POSITION CONTROL IN OPTICAL DATA CARRIERS WITH ADDRESS INFORMATION

This application claims the benefit, under 35 U.S.C. § 365 of International Application PCT/EP01/14458, filed Dec. 10, 2001, which was published in accordance with PCT Article 21(2) on Jun. 27, 2002 in English and which claims the benefit of German patent application No. 10064050.8 filed Dec. 21, 2000.

The present invention relates to an apparatus and a method for carrying out position control of an optical scanner on the tracks of a data carrier. In particular, the invention relates to the performance of track jumps in optical storage media whose information tracks are interrupted by addressing information items.

A drive for reading from and writing to an optical storage medium is usually equipped with an optical scanner whose scanning beam is directed onto the optical storage medium by means of an objective lens. This objective lens is finely positioned relative to the tracks of the storage medium by means of an actuator. The optical scanner together with the actuator is coarsely positioned by a driving motor. A track jump is typically effected, then, by coarse movement of the scanner by means of the driving motor, by counting-down of crossed tracks and acceleration or deceleration of the actuator for fine movement of the scanner with the aid of temporally predetermined pulses. This applies to optical storage media which do not have address information items in the form of prepits that are laterally offset with respect to the track, and in which the information is stored only in depressions (groove). However, in the presence of optical storage media whose information is stored both in depressions (groove) and elevations (land), a track jump in this way is no longer possible in a straightforward manner.

In optical data carriers in which information items are stored only in groove tracks, such as e.g. CD, CD-ROM, CD-VIDEO, CD-R, CD-RW, DVD-ROM, DVD-R and DVD-RW, the signals TZC and MZC are used in order to detect the position of the scanning beam with respect to the track. In this case, e.g. the signals TZC (Track Zero Cross) and MZC (Mirror Zero Cross) can be obtained from the track error and mirror signals. TZC is generated by comparing the track error signal TE with zero with the aid of a comparator. The track error signal itself can be derived with the aid of various track error forming methods (e.g. push-pull, DPP, DPD, 3-beam, . . . ). The TZC signal exhibits a change in its output signal (edge) whenever the centre of groove or the centre of land is reached. Since useful data are stored only on groove, the MZC signal can additionally be evaluated in order to find the centre of the information track. The MZC signal is likewise formed with the aid of a comparator. The summation signal of selected detectors is subjected to low-pass filtering in order to filter out the high-frequency signal components of the stored information items (pits) and to obtain a signal proportional to the average reflectivity. This signal is often called the mirror signal. In the case of the abovementioned disc formats, the average reflectivity differs between the written tracks (typically groove, series of pits) and the unwritten areas in between (typically land). A comparator compares the mirror signal with the comparator level CL, generally zero, and thus generates the signal MZC. An alternative to this, see FIG. 2, exploits the property that the HF modulation is greatest on track centres and the lower envelope of the HF signal exhibits a low reflection factor, whereas exactly between the tracks the HF modulation is small and the lower envelope exhibits a higher reflection factor. In order to detect this, the lower envelope (HFE) is formed from the DC-coupled HF signal by peak value detection. The output signal of this peak value detector is applied to a comparator either directly or after passing through a low-pass filter, which comparator compares its input signal with a threshold value (comparator level) and generates the binarized signal MZC.

The signal TZC typically has its zero crossing in the centre of groove or land, whereas the signal MZC typically has its zero crossing precisely at the edges between groove and land, or between land and groove. This relationship results in a phase shift of ±90° between the signals TZC and MZC. This phase shift enables unambiguous detection of the direction of movement of the scanning beam of the optical unit with regard to the current track position, which can be derived from the state "Cond" depicted in FIG. 2, which may lie between 0 and 3.

In most of the abovementioned optical storage media, no address information items are provided in a form which occasionally invalidates or interrupts the track error signal. Since the storage of the useful information items is envisaged only in depressions, so-called grooves, the MZC signal always has a specific value when the track centre of the grooves is reached. Thus, in these storage media, in order to switch on the track regulator, it is necessary only to wait for the TZC signal to have an edge when the MZC signal simultaneously shows the centre of the information track. As a further criterion, however, as described above, the relative speed between the scanning beam and the tracks on the disc should be detected, so that the track regulator is able to reduce the remaining kinetic energy. Shortly before the regulator is switched on, the fact of whether the relative speed is low enough actually to enable the regulator to be switched on successfully is usually detected by evaluation of the frequency of the track crossings.

In DVD-RAM discs, it is not possible to generate the signal MZC in the manner described above. When recording media of this type are used, it is not possible, in the course of the crossing of the tracks in the radial direction, to obtain information about the direction in which the light beam crosses the tracks of the recording medium. The so-called mirror signal MZC which is generated for this purpose in conventional data carriers and detects a region free of data markings, the so-called mirror area, has double the frequency in land-and-groove recording media. Track and intermediate track, owing to the data markings present there, have a lower reflectivity than the region which is located between track and intermediate track and in which the mirror signal then has its maximum. Consequently, a comparison of the phase angle of the track error signal and of the mirror signal for direction identification is no longer meaningful on account of the doubled frequency of the mirror signal.

An object of the present invention consists in proposing a method and an apparatus which reliably and rapidly ensure the track coupling-in of the scanning beam after a track jump, even in optical storage media whose tracks are interrupted by header areas. Preferably, this reliable and rapid track coupling-in is also intended to be ensured for DVD-RAM discs, in which both the groove tracks and the land tracks contain information items. According to the present invention, this object is achieved by means of a method according to claim 1 and an apparatus according to claim 7. Preferred developments are defined in the subordinate claims.

The accompanying drawings serve for elucidating the invention in greater detail. In the drawings.

Figure 1:
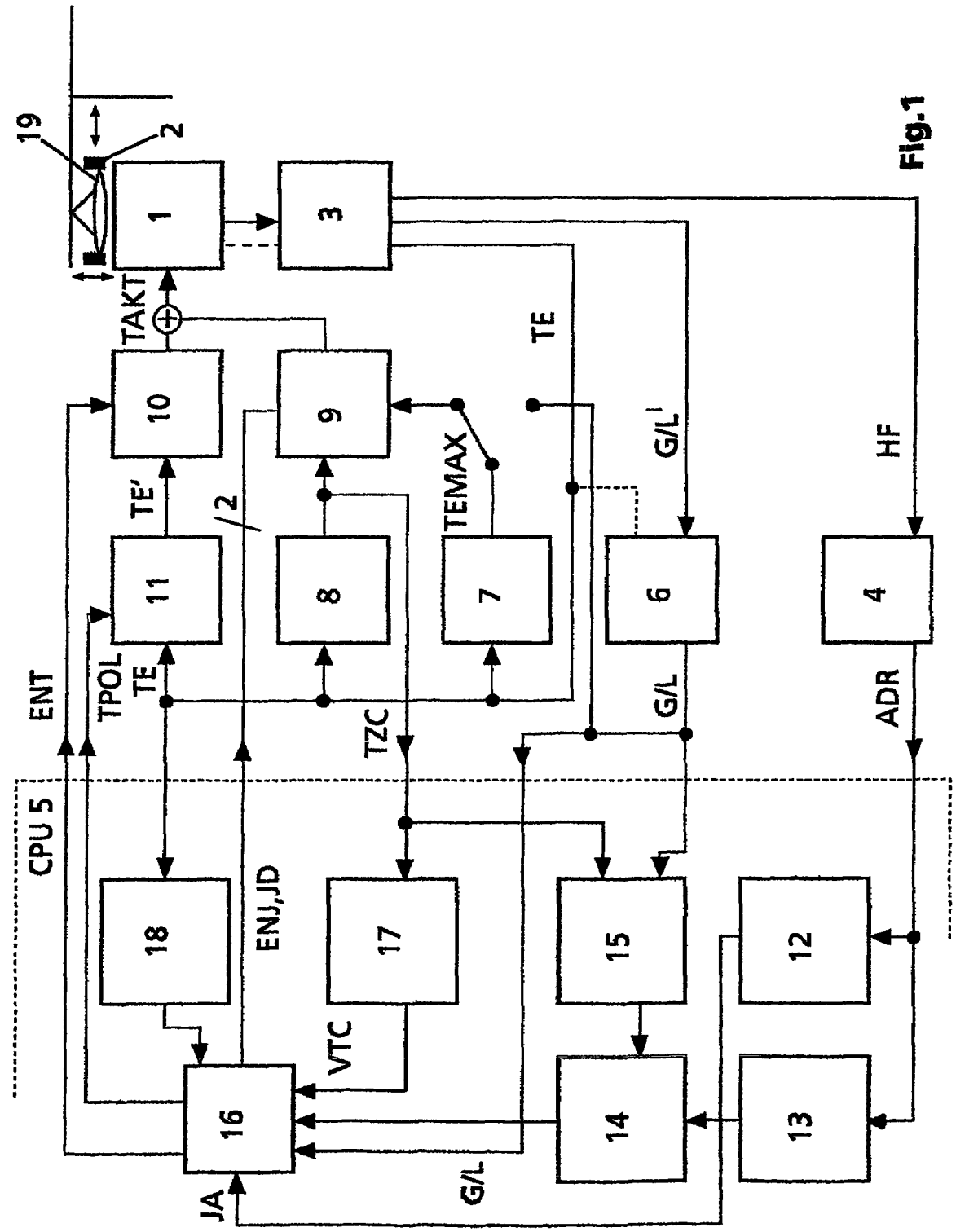
FIG. 1 shows a block diagram of an apparatus according to the invention.
Figure 2:
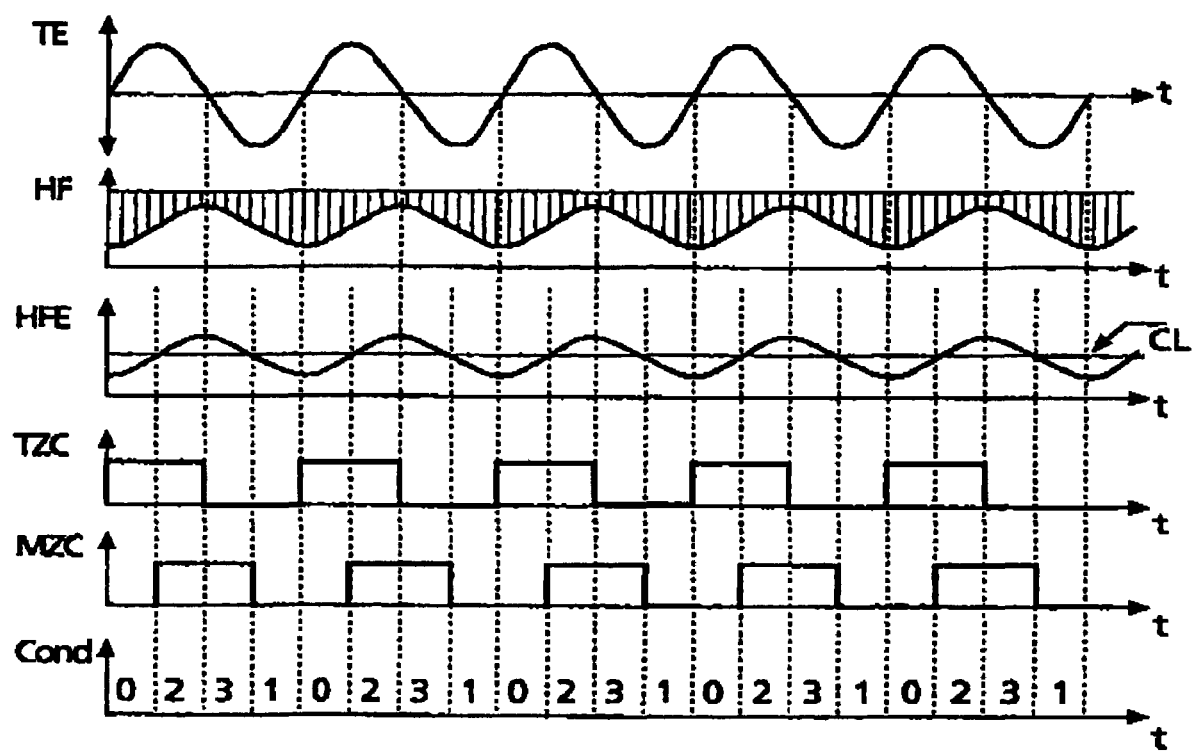
FIG. 2 shows the unambiguity of the phase angle of TZC and MZC signal with regard to the error signal TE

The present invention will now be illustrated using a preferred exemplary embodiment.

A track jump is generally effected in a number of steps. Firstly, as has already been explained, a coarse jump is carried out in the direction of the destination track by the entire optical scanner being moved by a driving motor. After the coarse jump, generally a track regulating circuit is closed in order that the scanner is temporarily stabilized on a track. Afterwards, if necessary, one or more correction jumps are carried out by the scanning beam being moved by an actuator which performs the fine positioning of the scanner.

Before the track regulating circuit is closed in DVD-RAM storage media or similar media, it is necessary to check various states and conditions of the optical scanning system and, in particular, of the scanning beam. In particular, the regulator must be prevented from being closed at instants at which the track error signal is not valid. This is the case primarily when the scanning beam is currently sweeping over the address information items (prepits of the header) not arranged in the track centre. Furthermore, before the track regulator is switched on, it must be ensured that the chosen track polarity corresponds to that of the jump destination since the destination information may lie both on groove and on land and the chosen track polarity must correspond to the type of destination track. A further difficulty results from the relatively rapid sequence of stored address information items.

A coupling-in or track jump operation should be ended within the time interval between two address information items. It is advantageous for the track regulator to be closed only in proximity to the track centre, that is to say when the track error signal TE is almost zero. Furthermore, at the coupling-in instant near the track centre, the relative speed between the scanning beam and the tracks on the disc should also be reduced to an extent such that the track regulator is able to reduce the remaining kinetic energy. In principle, with eccentric discs, this is the case only when the relative movement in the track transverse direction between tracks on the disc and the actuator currently exhibits a change in direction. Owing to the ever smaller track spacings and the ever higher rotational speeds of present and future high-density storage media, this problem will be further intensified since the address information items succeed one another more and more rapidly at higher rotational speeds but the stabilization time for switching on the track regulator cannot be shortened arbitrarily. One aspect of the invention resides in activating the regulator not exactly on the destination track but also already in proximity thereto and then reaching the destination by means of correction jumps. In this case, it should be noted that the actual destination track and the track on which the track regulator is to be momentarily activated may be possibly be of different types and, accordingly, have different track polarities.

These boundary conditions also exist analogously in the case of media whose useful information is admittedly stored only on groove, but whose address information items likewise occasionally invalidate the track error information TE. In contrast to DVD-RAM, however, in this case the polarity of the track error signal TE is always the same since, after all, information is never read from land tracks or written thereto.

If a track jump over a relatively long jump distance is then initiated, then the track regulating circuit is opened and the scanner is displaced by the jump distance by motor, so-called coarse jump with track motor. This is done by counting down the tracks to be crossed. Having arrived at the jump destination, which, if appropriate, is only a provisional destination, the coarse jump is ended and an attempt is made to close the track regulating circuit at the destination position. Since the destination position may lie on a groove or on a land, all the above-described conditions or criteria for closing the regulating circuit should be fulfilled simultaneously. They are:

a) track error signal TE is valid, i.e. address information items are not read, no header area is swept over b) scanning beam is in proximity to a track centre, TE is almost zero c) relative speed is low, that is to say, for example, that the TZC frequency is sufficiently low d) preset track polarity (groove/land) is identical to that of the jump destination, e) time interval until traversal of the next address information item is longer than the time required for regulator stabilization.

In optical storage media which only contain information items on groove tracks, criterion d) is to be replaced by the criterion d') the current track is identical to the destination track.

To a certain extent, criteria c) and d) have opposing properties. This stems from the fact that, at a sufficiently low TZC frequency, the frequency of a corresponding polarity signal is also low. Accordingly, there is, in principle, a 50% probability that criteria a) to c) are fulfilled but the predetermined regulating parameter of track polarity for position regulation of the scanning beam does not currently correspond to the track polarity of the destination track, that is to say groove or land, on which the regulating circuit is to be closed. Since only the time interval between the address information items is in each case available for closing the track regulator, the theoretical possibility exists that, between the successive address information items, the destination track with the polarity sought, criterion d), never coincides temporally with the other criteria since the change in polarity takes place too slowly. Moreover, owing to the currently low relative speed, it is unlikely that the scanning beam will reach the destination track within the time interval between two address information items.

Equally, in the case of optical storage media which only contain information items on groove tracks, to a certain extent criteria c) and d) may have opposing properties. This stems from the fact that, at a sufficiently low TZC frequency, there is a 50% probability that criteria a) to c) are fulfilled but the scanning beam does not currently lie on the destination track. Since only the time interval between the address information items is in each case available for closing the track regulator, the theoretical possibility exists that, between successive address information items, the destination track (criterion 4a) never coincides temporally with the other criteria. Moreover, owing to the currently low relative speed, it is unlikely that the scanning beam will reach the destination track within the time interval between two address information items.

In order to solve the problem, two solutions are proposed according to the invention:

If criteria a) to c) are fulfilled simultaneously, but criterion d) destination track polarity or d') destination track is not fulfilled, then firstly the regulating circuit is closed on one of the secondary tracks. To that end, before the track regulator is switched on on one of the secondary tracks, the respectively matching track polarity is determined from a groove/land signal (G/L signal) obtained from the scanner and is set correctly. This is not necessary in the case of media whose information items are stored only on groove. After traversal of the next address information item (header), one or more correction jumps are then carried out, if necessary, with simultaneous changeover of the track polarity. If the position of the next address information item is still far enough away, it is advantageous for the correction jump still to be carried out before the next address information item. To that end, it is important to know the stabilization time of the track regulator and the time before the next address information item is reached. Should the anticipated stabilization time be longer than the time remaining before the next address information item, then the correction jump is delayed until the next address information item has been passed.

In accordance with the second solution, the track regulator is not closed and the scanner is not stabilized on a secondary track before the correction jump is initiated, which stabilizes the scanning beam at any rate on the desired track type. In this case, too, what is crucial for the initiation of the correction jump is whether the correction jump can be reliably ended before the next address information item is read.

In both cases, the correction jump can be effected in a temporally controlled manner or with the aid of evaluation of the TE signal. In the case of time control, predetermined pulse lengths of acceleration or braking pulses are used, which displace the actuator by the distance from groove to land, or vice versa.

In one exemplary embodiment, during such a correction jump, the instantaneous position of the actuator relative to the track is acquired by evaluation of zero crossing and maximum value of the TE signal. As an alternative, instead of acquiring the maximum value of the TE signal, it is also possible to use the G/L signal.

If the scanning beam is displaced from groove to land, or vice versa, then the TE signal will assume a maximum value once during this jump. This maximum value of this TE amplitude occurs when the scanning beam is situated exactly between groove and land. In other words, this maximum amplitude identifies exactly half the distance between groove centre and land centre. Thus, if the intention is to effect for example a correction jump from groove to land, then, in accordance with the first solution, the track regulating circuit is opened and the actuator is accelerated by an acceleration pulse until the TE signal has assumed a maximum value. From here, the actuator is decelerated by a braking pulse of the same length. The track regulator can then be switched on again. As an alternative, it is possible, as already mentioned, to use the switching edge of the signal G/L for ending the acceleration pulse or starting the braking pulse, since the switching edge occurs at the same position of the scanning beam with respect to the track as the maximum of the track error signal TE.

In accordance with the second solution, even without momentarily closing the track regulating circuit, the zero crossing of the TE signal from the secondary track is awaited and then the procedure is as described above. In both cases, however, it must be ensured that the time for execution of the correction jump is not longer than the time remaining until the next address information item is swept over.

As an alternative, the deceleration pulse of the actuator can also last until the zero crossing of the TE signal on the destination track has been reached. Afterwards, the track regulator can be activated again.

FIG. 1 shows an exemplary embodiment according to the invention for realization of the jump function described. FIGS. 3 to 6 use examples to show track search operations with the most important signal profiles.

An optical scanner 1 contains an actuator 2, which is suspended such that it can move in the vertical and horizontal direction, and also the objective lens 19 mounted therein. The scanner 1 supplies the individual detector signals of its photodetector to a signal matrix 3, which forms the signals data signal HF, track error signal TE and groove/land signal G/L' from the individual signals by addition and subtraction. An address decoder 4 extracts the addresses ADR from the data stream HF read by the scanner 1 and supplies them to a CPU 5. A G/L detector 6 extracts the signal G/L from the signal G/L' supplied from the scanner 1, which signal G/L is used for track counting, for determining the position of the scanning beam relative to the track, and also for controlling the jump process. A maximum value detector 7 outputs a signal when a maximum value of the track error signal TE has been found. It comprises e.g. a differentiator and a comparator and can likewise be used for determining the position of the scanning beam relative to the track. A track zero crossing detector 8 changes its output level whenever the track error signal TE changes the sign. The signal TZC from the track zero crossing detector 8 and the signal TEMAX from the maximum value detector 7 or the signal G/L from the G/L detector 6 feed the jump time controller 91 which can be enabled by the CPU 5 and then triggers a correction jump as described above.

If the track regulation loop is to be closed, then this is done by activation of a regulator 10. In accordance with the track on which the track regulator is to be activated (groove or land), the CPU 5 interrogates the signal G/L and, accordingly, correctly sets the track polarity at the polarity switch 11 prior to the activation of the regulator 10.

The following functions are typically processed in the CPU 5 by means of a program, but, with a certain outlay, they can also be realized in hardware as a sequence control, for example in the form of a so-called state machine or the like.

An address sequence time controller 12 enables track jumps only within specific time intervals. The signal TE must be valid for this purpose and, before the sweeping-over of the next address information item from the address decoder 4, enough time must remain in order that the regulator transient recovery time is not undershot and/or in order that a correction jump can be reliably executed. The address sequence time controller 12 emits a signal JA with "high" level if a track jump is enabled, otherwise the signal CA has the "low" level. A track jump calculator 13 uses the instantaneous position of the scanning beam, which it obtains from the address decoder 4 and the destination position to calculate the number of tracks to be crossed. A comparator 14 compares the number of tracks counted by a track counter 15 with the value calculated in the track jump calculator 13 and outputs a success signal to a track jump supervisor 16 if the number of tracks crossed has reached the calculated value. As input signals, the track counter 15 receives the TZC signal from the track zero crossing detector 8 and the G/L signal from the G/L detector 6. The track jump supervisor 16 interrogates whether the track crossing speed VTC measured by a track crossing speed measuring unit 17 by means of the TZC signal is sufficiently low, whether, in accordance with the G/L signal, the destination track (groove or land) has been reached, whether the track signal error values TE determined by the window comparator 18 do not exceed a predetermined value (track centre should be near) and whether, in accordance with the signal JA from the address sequence time controller 12, enough time remains in order to close and stabilize the regulator prior to the reading of the next address information item. The track jump supervisor 16 supplies a tracking enable signal ENT to the regulator 10 and, in accordance with the determined track type (G/L) of the provisional jump destination, a track polarity signal TPOL to the polarity switch 11. It furthermore supplies a jump enabling signal ENJ and the corresponding jump direction JD to the jump time controller 9.

The end of a track jump will be explained below using three examples. In the examples, the provisional jump destination shall be reached, the coarse advance of the scanner has already been switched off, and the track crossing speed of the actuator shall already be reduced.

Some of the tracks of an optical data carrier are indicated diagrammatically in the top right region of each of FIGS. 3–6. The tracks run from left to right; they are each identified by their track type groove G or land L. The tracks are each interrupted by a header area H; three header areas H are shown in each of FIGS. 3–6. The destination track is identified by hatching; the direction of movement of the data carrier is indicated by means of an arrow DR. The light spot LS of the scanning beam is depicted symbolically at a few locations on its path—identified by LST—over the tracks. It moves from left to right in each case in the figure. To the left of the tracks, the track error signal TE is specified as a function of the location x perpendicular to the tracks. Below the tracks, a plurality of signal profiles are specified as a function of the time or the location y in the track direction. From top to bottom, they are the tracking enable signal ENT, the track error signal TE, the actuator signal TAKT emitted by the regulator 10 to the scanner 1, the track polarity signal TPOL, the groove/land signal G/L, the track crossing signal TZC and also a signal JA which specifies whether a jump can be begun at a specific instant or corresponding location, and can be ended before reaching the next header area, or whether this is not the case.

Figure 3:
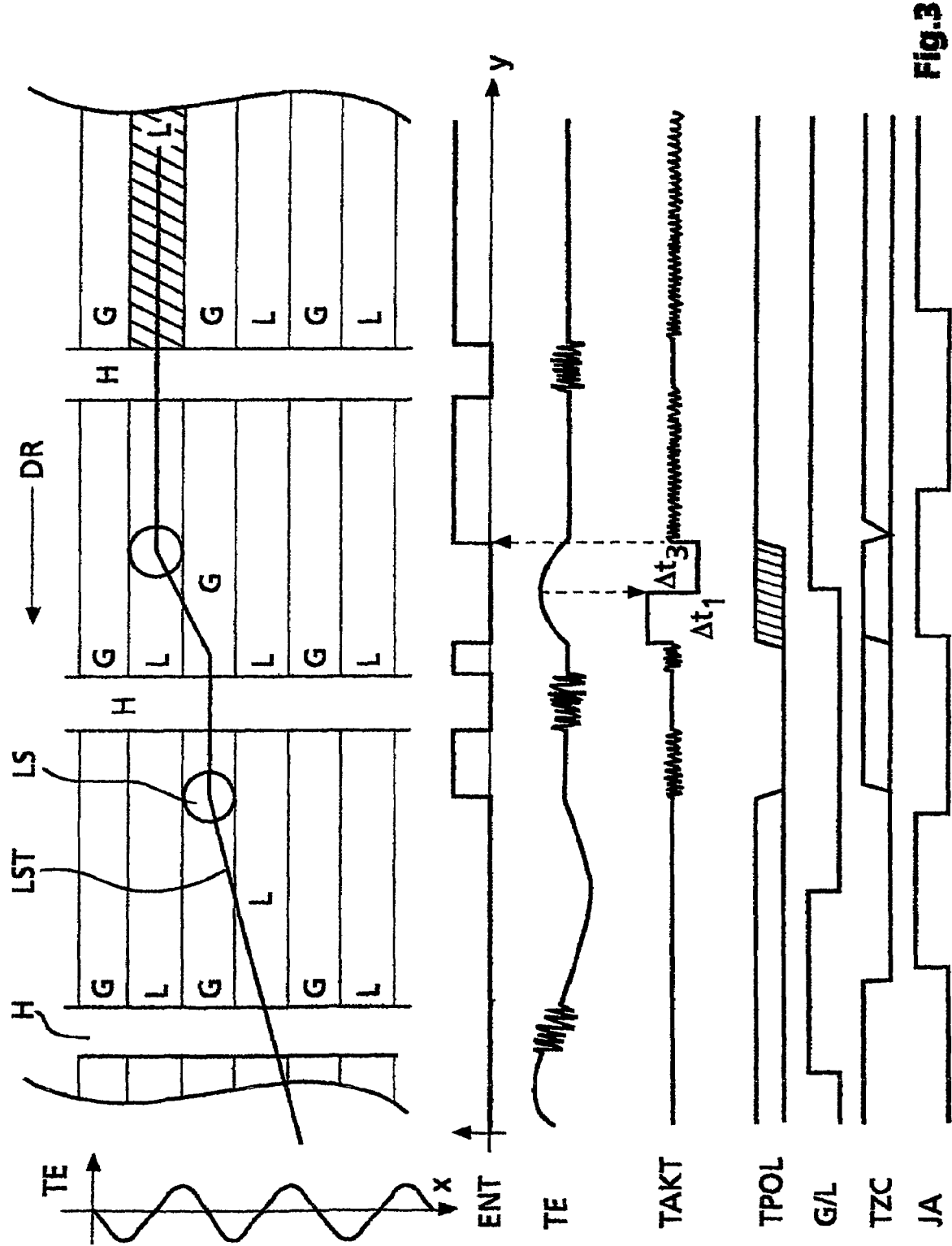
FIG. 3 shows a signal profile diagram in the event of a track jump.

FIG. 3 shows an example in which the destination sector lies on a land track. Since the preconditions
 a) track error signal TE is valid, address information item (header) is not currently being swept over
 b) track centre is near (TE almost zero); and
 c) relative speed is low (TZC frequency is sufficiently low)

are already satisfied shortly before reaching the destination track, the regulator 10 is already activated on the groove track before the final destination track. The CPU 5 interrogates the information G/L and activates the track regulator 10 with the correct track polarity. Since the condition
 e) time interval until traversal of the next address information item is longer than regulator stabilization time is no longer satisfied, the sweeping over of an address information item is still awaited before the subsequent correction jump. Afterwards, condition
 d) track polarity (groove/land) is identical to the jump destination is also satisfied by means of a correction jump. To that end, acceleration and braking pulses are applied to the actuator. At the same time, the track polarity is set in accordance with the destination track. The length $\Delta t1$ of the acceleration pulse of the actuator 2 is prescribed by the signal G/L or the TE maximum value detector 7; the length $\Delta t3$ of the braking pulse is oriented to the edge of TZC. The track jump is thus ended.

There is a 50% chance of all five conditions being satisfied simultaneously. In this case, the jump destination is reached directly, without a correction jump.

Figure 4:
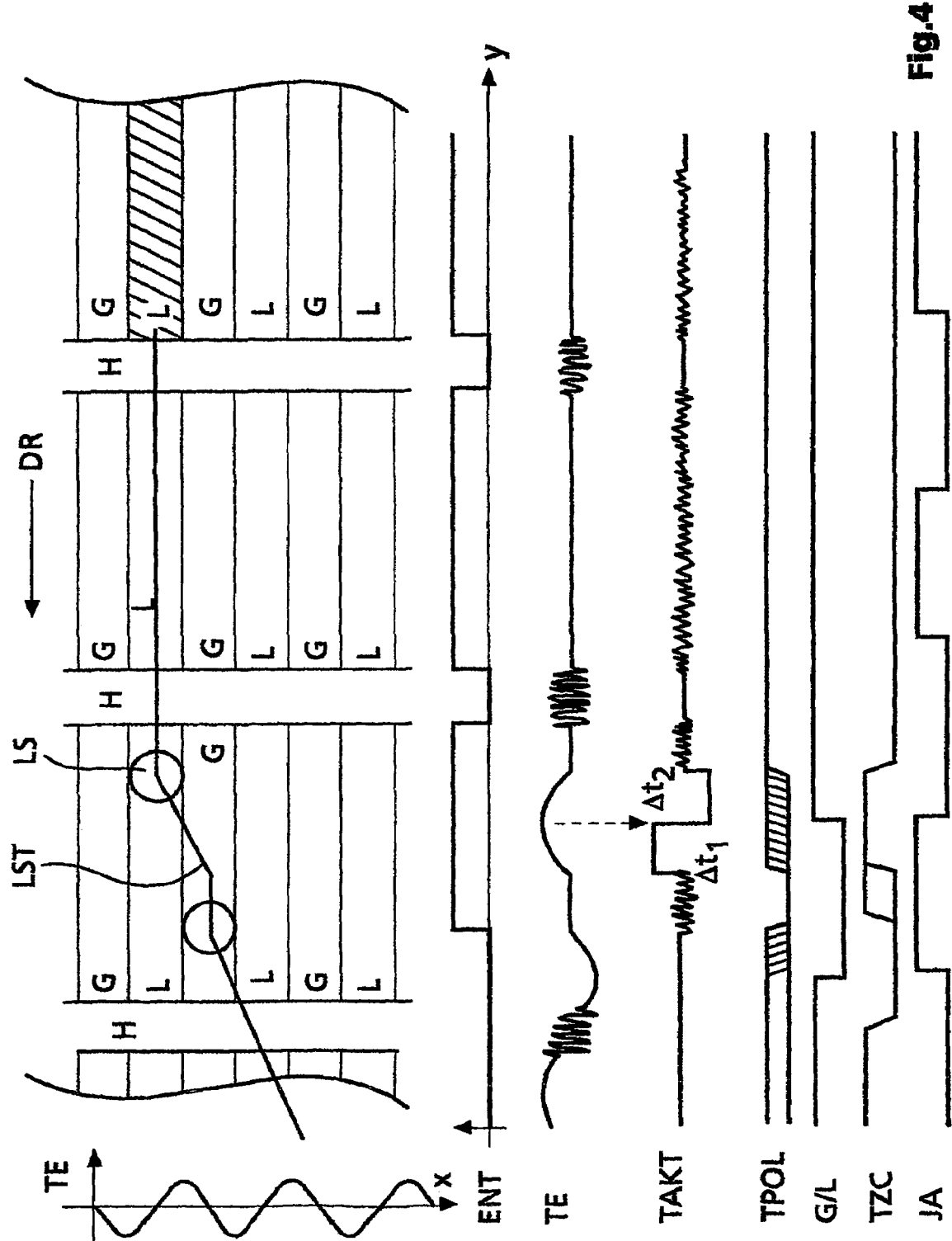
FIG. 4 shows a signal profile diagram in the event of another track jump.

FIG. 4 likewise shows an example in which the destination sector lies on a land track. Since the preconditions
 a) track error signal TE is valid, address information item (header) is not currently being swept over
 b) track centre is near (TE almost zero); and
 c) relative speed is low (TZC frequency is sufficiently low)

are already satisfied shortly before reaching the destination track in this case, too, the regulator 10 is already activated on the groove track before the destination track. The CPU 5 interrogates the information G/L and activates the track regulator 10 with the correct track polarity. The track regulating circuit is closed for the purpose of stabilization; since the condition
 e) time interval until traversal of the next address information item is longer than regulator stabilization time is also satisfied, the sweeping over of an address information item is not still awaited before the correction jump, rather condition
 d) track polarity (groove/land) is identical to the jump destination is also satisfied by means of a correction jump still before the next address information item. To that end, acceleration and braking pulses are applied to the actuator. At the same time, the track polarity TPOL is set in accordance with the destination track. The length $\Delta t1$ of the acceleration pulse of the actuator 2 is prescribed by the signal G/L or the TE maximum value detector 7; the length $\Delta t2$ of the braking pulse is in this case chosen to be the same as the length $\Delta t1$. The track jump is thus ended.

Figure 5:
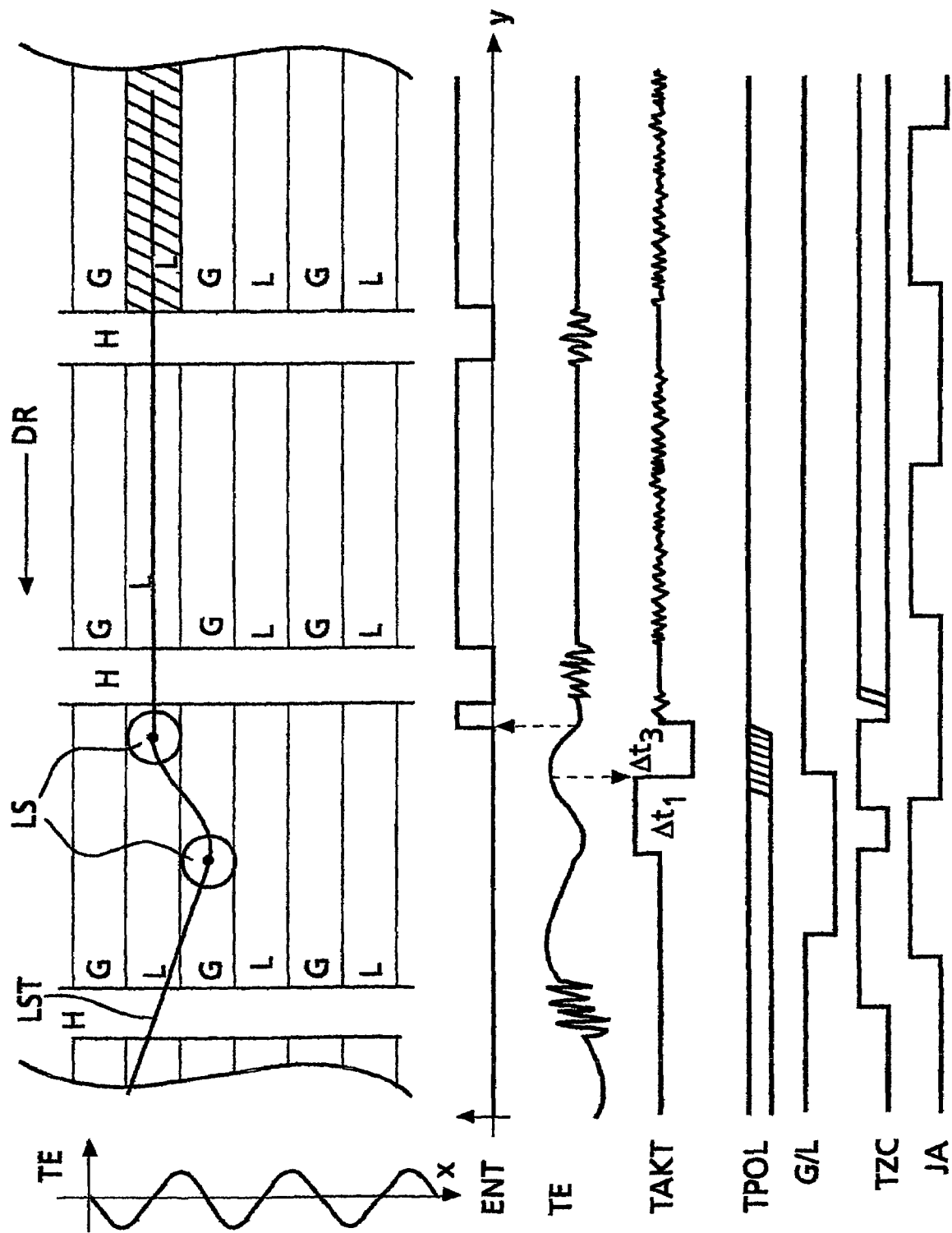
FIG. 5 shows a signal profile diagram of a further track jump.

FIG. 5 likewise shows an example in which the destination sector lies on a land track. Since the preconditions
 a) track error signal TE is valid, address information item (header) is not currently being swept over
 b) track centre is near (TE almost zero); and
 c) relative speed is low (TZC frequency is sufficiently low)

are satisfied only shortly after reaching the destination track, the track position is ascertained from the zero crossing of the track error signal TE. The CPU 5 interrogates the information G/L and checks whether the current track type corresponds to the destination track type. Since this is not the case here, but the condition
 e) time interval until traversal of the next address information item is longer than regulator stabilization time is satisfied, i.e. the signal JA is set to "high", the sweeping over of an address information item is not still awaited before the correction jump. In this case, the correction jump is initiated without the track regulator 10 being closed beforehand. As a result, condition
 d) track polarity (groove/land) is identical to the jump destination can also be satisfied before reaching the next address information item. To that end, acceleration and braking pulses are applied to the actuator. At the same time, the track polarity is set in accordance with the destination track. The length Δt1 of the acceleration pulse of the actuator 2 is prescribed by the signal G/L or the TE maximum value detector 7; the length Δt3 of the braking pulse is oriented to the edge of TZC.

Since, in the case of FIG. 5, the kinetic energy of the actuator 2 was not reduced by momentary closing of the track regulator 10 before the initiation of the correction jump, generally a different pulse length of acceleration pulse and braking pulse is necessary in order to move the actuator 2 to the destination track. It may be advantageous, therefore, to employ the method outlined in FIG. 4 in order to reduce the residual relative speed of the scanning beam relative to the track firstly by activation of the track regulator and then to initiate the correction jump.

The descriptions above can also be applied analogously to media whose useful information is admittedly stored only on groove but whose address information likewise occasionally invalidates the track error information. The instantaneous position of the actuator 2 relative to the track can be detected by evaluating the zero crossings of the TE signal. It is advantageous additionally to use the MZC signal in order to monitor the position of the scanning beam and to avoid the ambiguity of the TZC edges. If the scanning beam is displaced from one written track to the next written track, or vice versa, then the TE signal will have a zero crossing once during this jump. This zero crossing of the TE amplitude occurs when the scanning beam is situated exactly between two written tracks. The zero crossing thus identifies exactly half the distance between track centre and next track centre. At the same time, the signal MZC will show that the scanning beam is not situated on the centre of a readable track. In other words, if a correction jump by one track is to be effected, then, in the first case, the track regulating circuit is opened and the actuator 2 is accelerated by an acceleration pulse until the TE signal passes through a zero crossing. From here, the actuator 2 is decelerated by a braking pulse for as long as the acceleration pulse lasted. The track regulator 10 can then be switched on again. For the second case, even without momentarily closing the track regulating circuit, the first zero crossing of the TE signal of the secondary track can be awaited and then the procedure is as described above. In both cases, however, it should be ensured that the time for executing the correction jump is not longer than the time remaining before the next address information item is swept over. As an alternative, the deceleration pulse of the actuator 2 can also last until the zero crossing of the TE signal on the destination track is reached. The track regulator 10 can then be activated again.

It is likewise advantageously possible to begin a track jump even before a header area, if it is ensured that it is reliably ended only after the sweeping over of this header area in the next or one of the following useful data areas, and no information items disrupted by the header area are required for jump control. This is the case in particular with a very high relative speed between data carrier and scanning beam, that is to say, for example, with a high rotational speed of an optical disc, or with very short header areas and/or very short distances between two header areas. In this case, the signal JA is to be set to "high" as long as a jump can be begun in the useful data area and be reliably ended in a following useful data area. The conditions in this respect are to be chosen or adapted accordingly.

Figure 6:
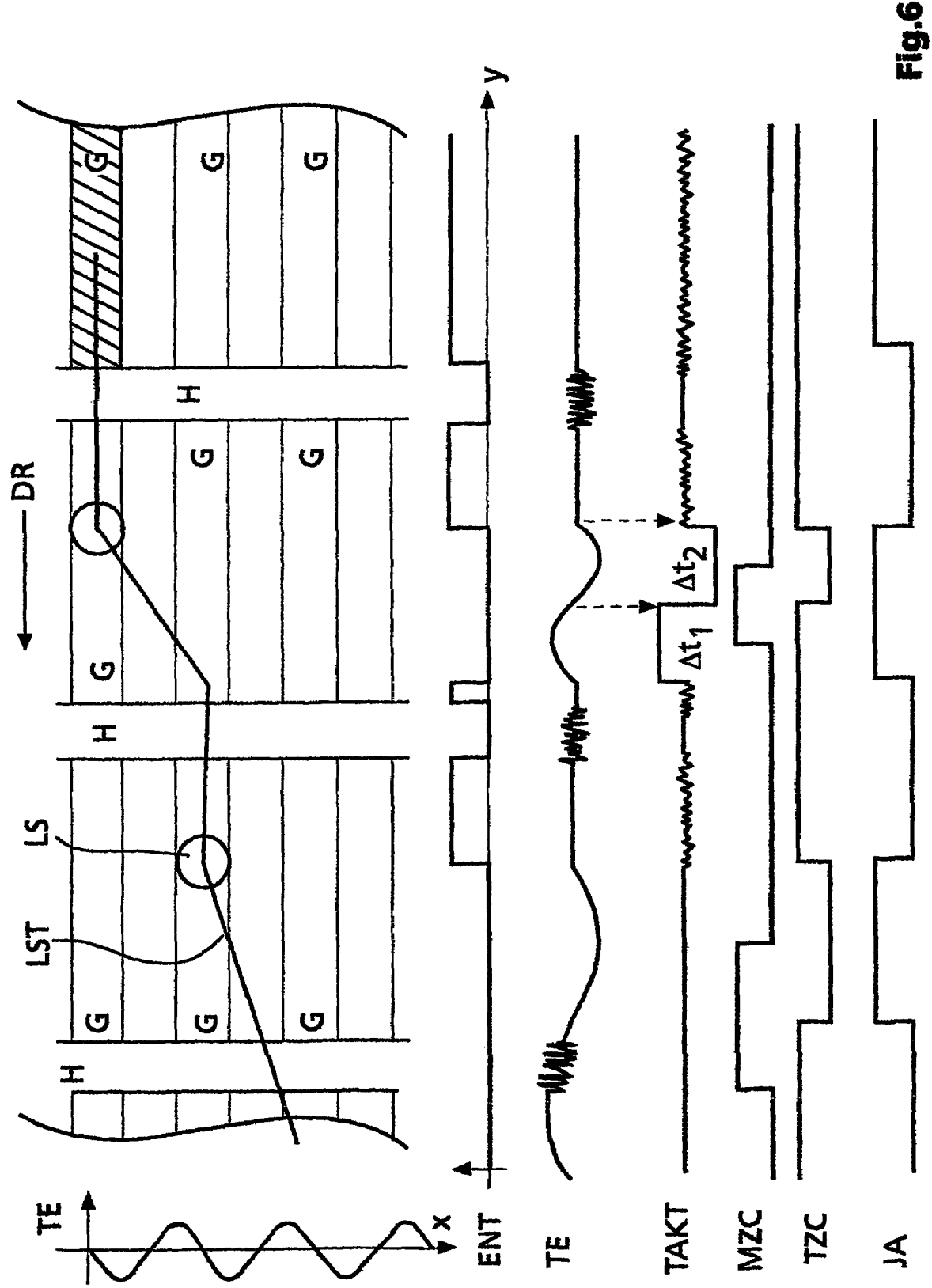
FIG. 6 shows a signal profile diagram of yet another track jump.

FIG. 6 shows an example, of a data carrier, in which data are present only in groove tracks, and in which the destination track is not immediately reached. Only the groove tracks G are identified here since the L tracks contain no information. Since the preconditions a) track error signal TE is valid, address information item (header) is not currently being swept over b) track centre is near (TE almost zero); and c) relative speed is low are already satisfied shortly before reaching the destination track, the regulator 10 is already activated on the track before the destination track. Since the condition e) time interval until traversal of the next address information item is longer than regulator stabilization time is no longer satisfied, the sweeping over of an address information item is still awaited before the correction jump. Afterwards, condition d') current track is identical to the jump destination is also satisfied before by means of a correction jump. To that end, acceleration and braking pulses are applied to the actuator 2. The length Δt1 of the acceleration pulse of the actuator 2 is derived from the signal TZC; the length Δt2 of the braking pulse is identical to the length Δt1 of the acceleration pulse. The track jump is thus ended.

However, in this case, too, there is a 50% probability of all five conditions being satisfied simultaneously. The jump destination can then be reached directly, without a correction jump.

Track jumping on optical storage media whose address information invalidates the track error signal TE, or other signals required for track jumping, at time intervals is made more secure and more reliable by the methods outlined.

The invention claimed is:

1. Method for position control of an optical scanning device for scanning and/or writing to tracks of a data carrier comprising a sequence of address information items, the method having the steps of providing a permissibility signal which indicates that the optical scanning device does not sweep over one of the address information items, providing a track proximity signal which indicates that the distance between the optical axis of the scanning device and the track center of a track currently being swept over is less than a predetermined value, and closing a regulating circuit for stabilizing the optical scanning device on a track only if the permissibility signal and the track proximity signal are provided and if a time interval from a point currently being swept over until a next one of the address information items is being read is greater than a known stabilization time of the regulating circuit.

2. Method according to claim 1, wherein the regulating circuit is closed only if additionally a track crossing speed of the optical scanning device falls below a predetermined value.

3. Method according to claim 1, wherein the regulating circuit is closed irrespective of whether the track type, namely groove or land, of the track currently being swept over is identical to that of a predetermined destination track.

4. Method for carrying out a track jump, where the track jump comprises a coarse jump, and wherein position control of the optical scanning device according to claim 1 is effected after the coarse jump.

5. Method according to claim 4, wherein the tract jump is temporally controlled using a position signal obtained from the optical scanning device.

6. Apparatus for position control of an optical scanning device for scanning and/or writing to tracks of a data carrier, the tracks comprising a sequence of address information items, the apparatus having an address sequence time control device for outputting a permissibility signal which indicates that the optical scanning device does not sweep over one of the address information items, a track proximity determining device for outputting a track proximity signal which indicates that the distance between the optical axis of the scanning device and the track center of a track currently being swept over is less than a predetermined value, and a track jump supervisory device for closing a regulating circuit for stabilizing the optical scanning device on a track only if the permissibility signal and the track proximity signal are provided, and if the address sequence time control device ascertains that a time interval until a next one of the address information items is being scanned is greater than a known stabilization time of the regulation circuit.

7. Apparatus according to claim 6, wherein provision is furthermore made of a track crossing speed measuring device for outputting a speed assessment signal which specifies whether a track crossing speed of the optical scanning device exceeds a predetermined value.

8. Apparatus according to claim 6, wherein the track proximity determining device has a window comparator, used to ascertain whether a distance between the optical axis of the scanning device and the track center of the track currently being swept over is less than a predetermined value.

9. Apparatus according to claim 6, wherein the regulating circuit is closed irrespective of whether the track type, namely groove or land, of the track currently being swept over is identical to that of a predetermined destination track, and, if appropriate, a correction jump to the destination track is effected if the track type encountered does not correspond to the type of the predetermined destination track.

10. Apparatus for carrying out a track jump having an optical scanning device and an apparatus for position control according to claim 6, equipped to carry out position control of the optical scanning device after the track jump.

11. Apparatus according to claim 10, wherein the track jump is temporally controlled using a position signal obtained from the optical scanning device.

* * * * *